US 6,786,476 B1

United States Patent
Kerstetter, III et al.

(10) Patent No.: US 6,786,476 B1
(45) Date of Patent: Sep. 7, 2004

(54) AIRSPRING

(75) Inventors: Randal Howard Kerstetter, III, Wadsworth, OH (US); Terry Frank Allen, Barberton, OH (US); Samson Samuel Apticar, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/624,729

(22) Filed: Jul. 21, 2003

(51) Int. Cl.[7] ................................................. F16F 5/00
(52) U.S. Cl. ..................... 267/64.11; 267/122; 524/493
(58) Field of Search ................................ 524/492–495, 524/262; 152/905, 525, 524; 267/64.11, 122, 64.27, 64.19, 64.21, 64.23, 64.24; 92/103 R, 103 F, 103 SD, 98 D; 525/211, 194, 232, 490, 237, 345; 526/335; 428/522, 221

(56) References Cited

U.S. PATENT DOCUMENTS

| | | | | |
|---|---|---|---|---|
| 2,999,681 A | * | 9/1961 | Muller et al. | 267/64.27 |
| 3,043,582 A | * | 7/1962 | Hirtreiter | 267/64.24 |
| 3,084,952 A | * | 4/1963 | Freitas et al. | 280/124.162 |
| 4,722,516 A | * | 2/1988 | Gregg | 267/64.27 |
| 4,763,883 A | * | 8/1988 | Crabtree | 267/64.27 |
| 4,931,508 A | | 6/1990 | Tobing | 525/194 |
| 5,504,137 A | * | 4/1996 | Sandstrom et al. | 524/492 |
| 5,605,951 A | * | 2/1997 | Sandstrom et al. | 524/494 |
| 5,610,216 A | * | 3/1997 | Sandstrom et al. | 524/381 |
| 5,733,963 A | * | 3/1998 | Sandstrom et al. | 524/492 |
| 5,954,316 A | * | 9/1999 | Voss | 267/64.27 |
| 6,252,008 B1 | * | 6/2001 | Scholl et al. | 525/333.5 |
| 6,279,633 B1 | | 8/2001 | Corvasce | 152/525 |
| 6,395,856 B1 | * | 5/2002 | Petty et al. | 528/24 |
| 6,458,871 B2 | * | 10/2002 | Materne et al. | 524/47 |
| 6,576,731 B2 | * | 6/2003 | Steinhauser et al. | 526/338 |
| 2001/0018495 A1 | * | 8/2001 | Scholl et al. | 525/231 |
| 2002/0035226 A1 | * | 3/2002 | Steinhauser et al. | 526/335 |
| 2004/0018368 A1 | * | 1/2004 | Kerstetter et al. | 428/522 |

* cited by examiner

Primary Examiner—Douglas C. Butler
(74) Attorney, Agent, or Firm—John D. DeLong

(57) ABSTRACT

The present invention is directed to an airspring having an airsleeve comprising an elastomeric liner; a reinforcing layer overlaying the liner; and a colorable elastomeric cover overlaying the reinforcing layer; the cover comprising: 100 parts by weight of elastomer comprising from about 30 to about 50 parts by weight of natural rubber, from about 10 to about 30 parts by weight of polybutadiene, and from about 30 to about 50 parts by weight of ethylene propylene diene terpolymer (EPDM); from about 20 to about 60 parts by weight, per 100 parts by weight of elastomer, of silica; and from about 1 to about 10 parts by weight, per 100 parts by weight of elastomer, of an organosilane polysulfide.

16 Claims, 1 Drawing Sheet

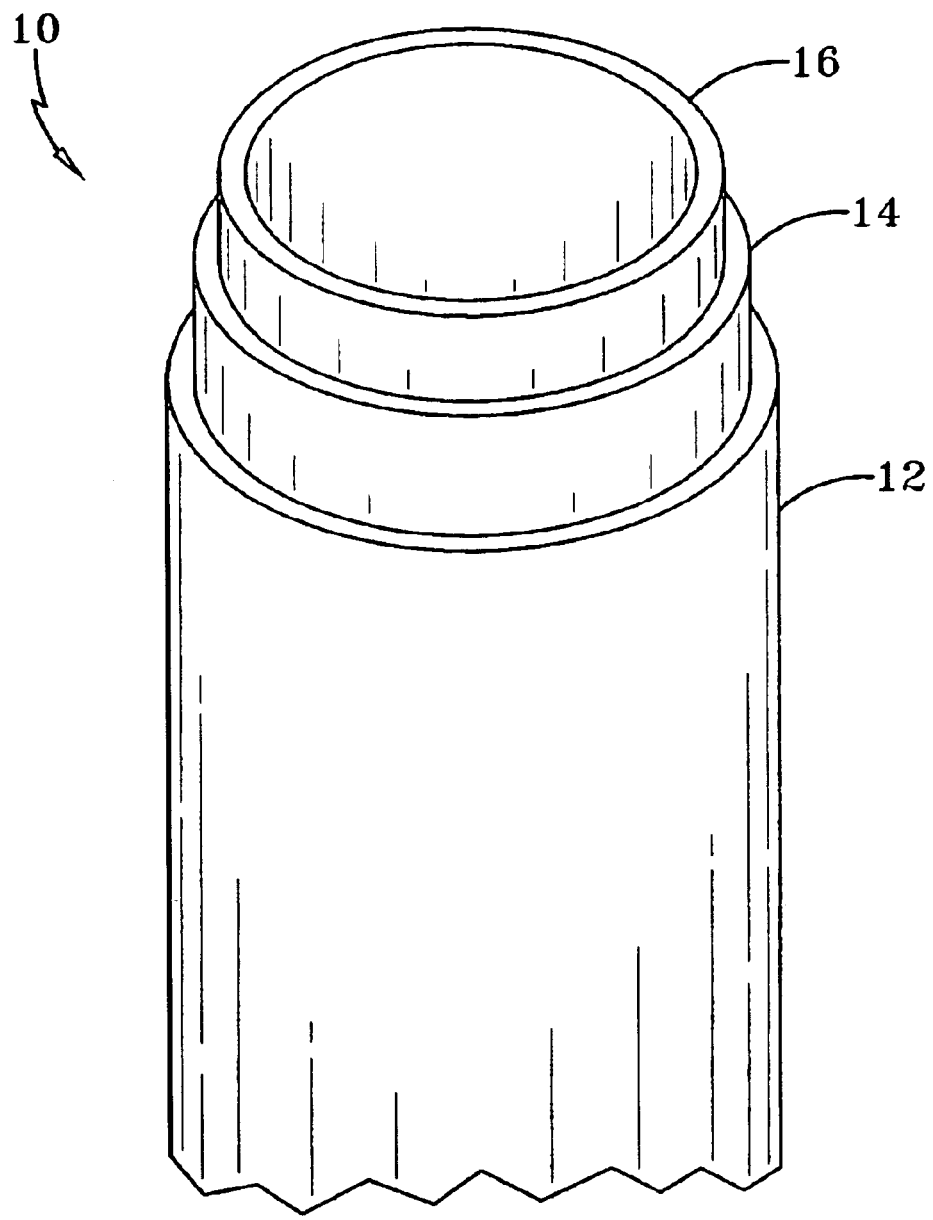

ID
AIRSPRING

FIELD OF THE INVENTION

The present invention is directed to an airspring having an airsleeve comprising an elastomeric liner; a reinforcing layer overlaying the liner; and a colorable elastomeric cover overlaying the reinforcing layer; the cover comprising: 100 parts by weight of elastomer comprising from about 30 to about 50 parts by weight of natural rubber, from about 10 to about 30 parts by weight of polybutadiene, and from about 30 to about 50 parts by weight of ethylene propylene diene terpolymer (EPDM); from about 20 to about 60 parts by weight, per 100 parts by weight of elastomer, of silica; and from about 1 to about 10 parts by weight, per 100 parts by weight of elastomer, of an organosilane polysulfide.

BACKGROUND OF THE INVENTION

Airsprings have been used for motor vehicles and various machines and other equipment for a number of years. The springs are designed to support a suspension load such as a vehicle. The airspring usually includes a flexible elastomeric reinforced airsleeve that extends between a pair of end members. The airsleeve is attached to end members to form a pressurized chamber therein. The end members mount the airspring on spaced components, or parts of the vehicle or equipment, on which the airspring is to be mounted. The internal pressurized gas, usually air, absorbs most of the motion impressed upon or experienced by one of the spaced end members. The end members move inwards and towards each other when the spring is in jounce, and away and outwards from each other when the spring is in rebound. The design height of the airspring is a nominal position of the spring when the spring is in neither jounce nor rebound.

There have been two basic designs of airsprings: a rolling lobe airspring, as seen in U.S. Pat. Nos. 3,043,582 and 5,954,316; and a bellows type airspring, as seen in U.S. Pat. Nos. 2,999,681 and 3,084,952. In a rolling lobe-type airspring, the airsleeve is a single circular-shaped sleeve secured at both ends. During jounce, the airsleeve rolls down the sides of a piston support. In a bellows-type airspring, the multiple meniscus-shaped portions of the airsleeve extend out radially as the spring is in jounce.

Airsleeves have a rubber innerliner, two plies of rubber coated cord fabric, and a rubber cover. These sleeves see their greatest commercial usage in the automotive helper spring market by being mounted as airsprings on shock absorbers and struts. Other uses include truck cab suspension springs, truck driver seat springs, automobile airsprings, and a variety of industrial airsprings.

In the manufacture of fabric-reinforced, molded rubber articles such as airsleeves, it is desirable to obtain strong adhesion between the fabric plycoat and the cover, and also high resistance to deterioration of the bond with flexing of the structure.

Airsleeves are typically black, owing to the presence of carbon black as a reinforcement. In some applications, however, it may be desirable to have an airspring cover with a color other than black. Such a cover would be useful for purposes of identification and uniformity. The cover compound must, however, satisfy the requirements of flex and adhesion.

SUMMARY OF THE INVENTION

The present invention is directed to an airspring having an airsleeve comprising an elastomeric liner; a reinforcing layer overlaying the liner, and a colorable elastomeric cover overlaying the reinforcing layer, the cover comprising: 100 parts by weight of elastomer comprising from about 30 to about 50 parts by weight of natural rubber, from about 10 to about 30 parts by weight of polybutadiene, and from about 30 to about 50 parts by weight of ethylene propylene diene terpolymer (EPDM); from about 20 to about 60 parts by weight, per 100 parts by weight of elastomer, of silica; and from about 1 to about 10 parts by weight, per 100 parts by weight of elastomer, of an organosilane polysulfide.

BRIEF DESCRIPTION OF THE DRAWING

The single FIGURE illustrates one embodiment of an airsleeve according to the present invention.

DESCRIPTION OF THE INVENTION

In one embodiment, the present invention is directed to an airspring having an airsleeve 10 shown in the accompanying drawing comprising an elastomeric liner 16; a reinforcing layer 14 overlaying the liner 16; and a colorable elastomeric cover 12 overlaying the reinforcing layer 14; the cover 12 comprising: 100 parts by weight of elastomer comprising from about 30 to about 50 parts by weight of natural rubber, from about 10 to about 30 parts by weight of polybutadiene, and from about 30 to about 50 parts by weight of ethylene propylene diene terpolymer (EPDM); from about 20 to about 60 parts by weight, per 100 parts by weight of elastomer, of silica; and from about 1 to about 10 parts by weight, per 100 parts by weight of elastomer, of an organosilane polysulfide.

Suitable EPDM include those having an ethylene content from about 45 to about 80 percent by weight. The EPDM also includes from about 1 to about 10 percent by weight of a diene monomer, and the balance substantially of propylene. In one embodiment, the EPDM comprises ethylidene norbornene. In another embodiment, the EPDM comprises a diene monomer selected from those as are known in the art and are commonly used in preparation of EPDM. Such diene monomers include, but are not limited to, any appropriate non-conjugated diene may be used including, for example, 1,4-hexadiene, dicyclopentadiene or ethylidene norbornene (ENB). In one embodiment, the EPDM is ROYALENE® 645, available from Crompton, as an ethylene-propylene-ethylidene norbornene terpolymer with an ethylene/propylene weight ratio of about 66/34, about 8.5 percent by weight of ENB, and a Mooney viscosity 1+4 (125° C.) of about 52.

The term "phr", as used herein, and according to conventional practice, refers to "parts by weight of a respective material per 100 parts by weight of rubber, or elastomer".

The vulcanization of the cover is conducted after a sulfur-vulcanizing agent has been intimately dispersed in the composition. Examples of suitable sulfur-vulcanizing agents include elemental sulfur (free sulfur), an amine disulfide, polymeric polysulfide or sulfur olefin adducts. Preferably, the sulfur-vulcanizing agent is elemental sulfur. The sulfur-vulcanizing agent may be used in an amount ranging from 0.1 to 8 phr, with a range of from 0.5 to 5.0 being preferred.

In one embodiment, the cover composition is cured with sulfur and peroxide. Suitable peroxides for curing along with sulfur include those that are normally used in such base stocks. For example peroxides, such as dicumyl peroxide, α-α-bis(t-butylperoxide)diisopropylbenzene, benzoyl peroxide, 2,4-dichlorobenzoyl peroxide, 1,1-bis(t-butylperoxy)3,3,5-trimethylcyclohexane, 2,5-dimethyl-2,5-bis(t-butylperoxy)hexane, 2,5-dimethyl-2,5-bis(t- butylperoxy)hexyne-3, and n-butyl 4,4-bis(t-butylperoxy) valerate. From 1 to about 10 parts by weight of peroxide are utilized based on 100 parts by weight of elastomer.

It is readily understood by those having skill in the art that the cover rubber composition would be compounded by methods generally known in the rubber compounding art, such as mixing the rubbers with various commonly used additive materials such as, for example, curing aids, activators, retarders, processing oils, resins, reinforcing resins, tackifying resins, plasticizers, fillers, pigments, fatty acids, zinc oxide, magnesium oxide, waxes, and peptizing agents. As known to those skilled in the art, the additives mentioned above are selected and commonly used in conventional amounts. Representative examples of such resins include phenolformaldehyde resins, hydrocarbon resins, coumarone-indene resins, and methylene donor/methylene acceptor type resins. Typical amounts of processing oils comprise about 1 to about 50 phr. Such processing oils can include, for example, aromatic, naphthenic, and/or paraffinic processing oils. Typical amounts of antioxidants comprise about 1 to about 5 phr. Typical amounts of antiozonants comprise about 1 to 5 phr. Typical amounts of fatty acids (such as stearic acid and oleic acid) are used in an amount ranging from about 0.2 to about 3 phr. Typical amounts of zinc oxide comprise about 0.5 to about 8 phr. Typical amounts of magnesium oxide ranges from 0 to 1.0 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

In one embodiment, the cover compound includes no diamine antiozonants that may stain or discolor the cover. The EPDM provides the necessary level of ozone resistance. However, nonstaining or noncoloring antioxidant/antiozonants may be used if desired.

Various colorants may be used to impart color to the cover composition, if desired. The colorants include those as are known in the art and may be organic dyes, inorganic dyes, organic pigments, or inorganic pigments. For example, such colorants might be pigments, classified according to CAS numbers, for example, red 38 CAS 6358-87-8; violet 32 CAS 12225-0800; blue 15 CAS 147-14-8, copper phthalocyanine; blue 29, CAS 57455-37-5, ultramarine blue; violet 19 CAS 1047-16-1; yellow 110 CAS 106276-80-6, yellow 109 CAS 106276-79-3; and white 6 CAS 13463-67-7, titanium dioxide. Carbon black in a non-reinforcing amount may be used as a colorant to impart black color to the cover. Colorants may be added in an amount sufficient to impart the desired level of color in the cover. In one embodiment, the cover composition includes phthalocyanine as Blue 626C dispersed on EP rubber, obtained from Akrochem.

The cover compound includes a reinforcing filler. Suitable reinforcing filler includes silica, but does not include carbon black. Carbon black, if used, is present only in a small amount, either as a colorant or due to its use as a carrier. It will be understood by one skilled in the art that various rubber additives are available for convenience in handling as a dispersion on a carbon black carrier. Carbon black, if used, is present in the cover compound in an amount less than 10 phr.

The commonly-employed siliceous pigments which may be used in the cover compound include conventional pyrogenic and precipitated siliceous pigments (silica), although precipitated silicas are preferred. The conventional siliceous pigments preferably employed are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The conventional silica may be also typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Accelerators may be used to control the time and/or temperature required for vulcanization and to improve the properties of the vulcanizate. In general, from 0.1 to 4 phr of total accelerator(s) is used. In one embodiment, only a primary accelerator may be used. In another embodiment, combinations of a primary and a secondary accelerator might be used with the secondary accelerator being used in smaller amounts (of about 0.05 to about 1.0 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are sulfenamides, amines, disulfides, guanidines, thioureas, thiazoles, thiurams, dithiocarbamates, xanthates and mixtures thereof. If a second accelerator is used, the secondary accelerator is preferably a guanidine, dithiocarbamate or thiuram compound. In one embodiment, triethanolamine is added to the cover composition in an amount ranging from about 1 to about 5 parts by weight per 100 parts by weight of elastomer.

It may be preferred to have the cover compound to additionally contain a conventional sulfur-containing organosilicon compound. Examples of suitable sulfur-containing organosilicon compounds are of the formula:

Z-Alk-S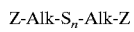-Alk-Z    I in which Z is selected from the group consisting of

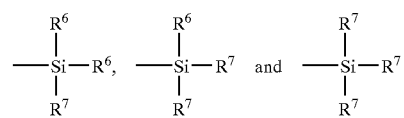

where $R^6$ is an alkyl group of 1 to 4 carbon atoms, cyclohexyl or phenyl; $R^7$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur-containing organosilicon compounds which may be used in the cover compound include: 3,3'-bis(trimethoxysilylpropyl)disulfide, 3,3'-bis(triethoxysilylpropyl)disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxy diethoxysilyl ethyl)tetrasulfide, 2,2'-bis(tripropoxysilylethyl)pentasulfide, 3,3'-bis(tricyclonexoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl)tetrasulfide, 3-methoxy ethoxy propoxysilyl 3'-diethoxybutoxy-silylpropyltetrasulfide, 2,2'-bis(dimethyl methoxysilylethyl)disulfide, 2,2'-bis(dimethyl sec.butoxysilylethyl)trisulfide, 3,3'-bis(methyl butylethoxysilylpropyl)tetrasulfide, 3,3'-bis(di t-butylmethoxysilylpropyl)tetrasulfide, 2,2'-bis(phenyl methyl methoxysilylethyl)trisulfide, 3,3'-bis(diphenyl isopropoxysilylpropyl)tetrasulfide, 3,3'-bis(diphenyl cyclohexoxysilylpropyl)disulfide, 3,3'-bis(dimethyl ethylmercaptosilylpropyl)tetrasulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec.butoxysilylpropyl)disulfide, 3,3'-bis(propyl diethoxysilylpropyl)disulfide, 3,3'-bis(butyl dimethoxysilylpropyl)trisulfide, 3,3'-bis(phenyl dimethoxysilylpropyl)tetrasulfide, 3-phenyl ethoxybutoxysilyl 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyl dodecyl)disulfide, 18,18'-bis(trimethoxysilyloctadecyl)tetrasulfide, 18,18'-bis(tripropoxysilyloctadecenyl)tetrasulfide, 4,4'-bis(trimethoxysilyl-buten-2-yl)tetrasulfide, 4,4'-bis(trimethoxysilylcyclohexylene)tetrasulfide, 5,5'-bis(dimethoxymethylsilylpentyl)trisulfide, 3,3'-bis(trimethoxysilyl-2-methylpropyl)tetrasulfide, 3,3'-bis(dimethoxyphenylsilyl-2-methylpropyl)disulfide.

The preferred sulfur containing organosilicon compounds for use in the cover compound are the 3,3'-bis(trimethoxy or triethoxy silylpropyl) sulfides. The most preferred compounds are 3,3'-bis(triethoxysilylpropyl)disulfide and 3,3'-bis(triethoxysilylpropyl)tetrasulfide. Therefore, as to formula I, preferably Z is

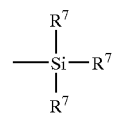

where $R^7$ is an alkoxy of 2 to 4 carbon atoms, with 2 carbon atoms being particularly preferred; alk is a divalent hydrocarbon of 2 to 4 carbon atoms with 3 carbon atoms being particularly preferred; and n is an integer of from 2 to 5 with 2 and 4 being particularly preferred.

The amount of the sulfur-containing organosilicon compound of formula I in the tear resistant rubber compound will vary depending on the level of other additives that are used. Generally speaking, the amount of the compound of formula I will range from 0.5 to 20 phr. Preferably, the amount will range from 1 to 10 phr.

The mixing of the cover rubber composition can be accomplished by methods known to those having skill in the rubber mixing art. For example, the ingredients are typically mixed in at least two stages, namely at least one non-productive stage followed by a productive mix stage. The final curatives including sulfur-vulcanizing agents, accelerators, and peroxide are typically mixed in the final stage which is conventionally called the "productive" mix stage in which the mixing typically occurs at a temperature, or ultimate temperature, lower than the mix temperature(s) of the preceding non-productive mix stage(s). The rubber, silica, and carbon black (if used) may be mixed in one or more non-productive mix stages. The terms "non-productive" and "productive" mix stages are well known to those having skill in the rubber mixing art.

Vulcanization of the cover rubber composition of the present invention is generally carried out at conventional temperatures ranging from about 100° C. to 200° C. Preferably, the vulcanization is conducted at temperatures ranging from about 110° C. to 180° C. Any of the usual vulcanization processes may be used, such as heating in a press or mold, heating with superheated steam, or hot air or in a salt bath.

The reinforcing layer includes a plycoat comprising a curable rubber composition. Elastomers that may be used in the plycoat compound include at least one elastomer selected from among elastomers conventionally used in manufacturing airsleeves included, but not limited to, elastomers such as epichlorohydrin rubber, polyisobutylene, halogenated butyl rubbers, natural rubber, polyisoprene, polybutadiene, styrene-butadiene, polychloroprene, EPDM, and blends of such elastomer. The plycoat compound may include any of various additives and fillers as in the cover compound.

The reinforcing layer includes, along with the plycoat, textile fibers treated with an RFL type adhesive dip. Textile fibers in the form of suitable cord or fabric may be in various forms, including woven fabrics, knitted fabric, or spun bonded fabric, and fiber cord. The cord or fabric may be comprised of various materials typically used as reinforcement in composite materials, including rayon, nylon, polyester, aramid, cotton, and combinations thereof. In one embodiment, the cord or fabric is nylon or polyester.

The reinforcing layer includes an adhesive composition useful in adhering textile fibers to the plycoat. In one embodiment, the so-called RFL adhesive composition may be comprised of resorcinol, formaldehyde, and one or more polymer latexes. In one embodiment, the polymer latex may include one or more of styrene-butadiene copolymer latex, vinylpyridine-styrene-butadiene terpolymer latex, or latexes made from polymers included in the plycoat, liner, or cover compositions.

The RFL adhesive dip is, in general, used in the form of an aqueous latex. The latices are prepared by free radical emulsion polymerization of styrene and butadiene to form a copolymer latex, and free radical emulsion polymerization of styrene, butadiene, and vinylpyridine to form a terpolymer latex. The charge compositions used in the preparation of the latices contain monomers, at least one surfactant, and at least one free radical initiator. Such latices are well known, and a suitable RFL dip may be made by any of various methods as are known in the art, for example, following the teaching of U.S. Pat. No. 3,525,703.

The RFL adhesive may optionally include a blocked isocyanate. In one embodiment from about 1 to about 20 parts by solid of blocked isocyanate is added to the adhesive. The blocked isocyanate may be any suitable blocked isocyanate known to be used in RFL adhesive dips including, but not limited to, caprolactam blocked methylene-bis-(4-phenylisocyanate), such as Grilbond-IL6 available from EMS American Grilon, Inc, and phenolformaldehyde blocked isocyanates as disclosed in U.S. Pat. Nos. 3,226,276; 3,268,467; and 3,298,984.

In accordance with this invention, the cord or fabric to be treated is dipped for one to three minutes in the RFL dip, and dried at a temperature within the range of about 75° C. to about 265° C. for about 0.5 minutes to about 20 minutes, and thereafter calendered into the plycoat rubber compound and cured therewith. The dip process may be carried out in one or two steps. Adjustment of the solids content of the dips for a one or two-step dipping process is done as required, as is known to one skilled in the art.

The airsleeve further includes an elastomeric liner. The liner may each comprise vulcanizable rubber compounds; the compounds used in the liner may be the same as that used in the cover, or it may be different. Elastomers that may be used in the liner compound include at least one elastomer selected from among elastomers conventionally used in manufacturing airsleeves included, but not limited to, elastomers such as epichlorohydrin rubber, polyisobutylene, halogenated butyl rubbers, natural rubber, polyisoprene, polybutadiene, styrene-butadiene, polychloroprene, EPDM, and blends of such elastomers. The liner compound may include any of various additives and fillers as in the cover compound.

Vulcanization of the airsleeve is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air. Such composites can be built, shaped, molded and cured by various methods which are known and will be readily apparent to those having skill in such art. Methods for making airsleeves are described in U.S. Pat. Nos. 3,794,538 and 6,264,178, fully incorporated herein by reference.

The airsleeve may be used in any of various airspring applications including truck cab suspension springs, truck driver seat springs, automobile airsprings, and a variety of industrial airsprings. These airsprings may be of various designs including, but not limited to, a rolling lobe airspring, for example as in U.S. Pat. Nos. 3,043,582 and 5,954,316, fully incorporated herein by reference, and a bellows-type airspring, for example as in U.S. Pat. Nos. 2,999,681 and 3,084,952, fully incorporated herein by reference.

The invention is further illustrated by the following non-limiting example.

EXAMPLE 1

In this example, the physical properties of a cover compound according to the current invention are illustrated. Airsleeve cover compounds were prepared according to Table 1, with amounts in parts by weight per hundred by weight of elastomer (phr). Cover test samples were prepared using samples 1–2 and tested for physical properties as indicated in Table 2. Tests were done according to the following protocols:

Rheometer

ODR at 150° C., ASTM D2048

Mooney Scorch at 121° C, ASTM D1646

Tensile, Elongation, and Hardness

Original, ASTM D412

Adhesion to Rubber Plycoat Compound, Modified ASTM D413

Original

Tear

Die C tear, ASTM D624

TEXUS Flex

Modified ASTM D3629-99

TABLE 1

| Sample | 1 | 2 Control |
|---|---|---|
| Natural Rubber | 40 | 40 |
| Polybutadiene[1] | 20 | 20 |
| EPDM[2] | 70 | 70 |
| Carbon Black (N550) | 0 | 55 |
| Silica | 55 | 0 |
| Coupling Agent[3] | 6 | 0 |
| Stearic Acid | 1.5 | 1.5 |
| Peptizer | 0 | 0.15 |
| Resin | 3 | 3 |
| Naphthenic Oil | 0 | 1.1 |
| Wax[4] | 2.1 | 2.1 |
| Titanium Dioxide | 5 | 0 |
| Blue Pigment | 4 | 0 |
| Antidegradant[5] | 0 | 6.28 |
| Zinc Oxide | 4.31 | 4.31 |
| Sulfur | 1.89 | 1.72 |
| TBBS | 1 | 0.92 |
| 70% Dicumyl Peroxide | 1 | 0.92 |

[1]BUDENE ® 1207
[2]ROYALENE ® 645
[3]72 weight percent bi-functional polysulfidic organosilane dispersed on silica
[4]paraffinic and microcrystalline
[5]paraphenylene diamine type

TABLE 2

Mooney Scorch, 121° C. 30 Minutes

| | | |
|---|---|---|
| Minimum Viscosity | 37 | 26 |
| Time to 5 pt. Rise, Mins. | 56 | 42 |

Rheometer, ODR 150° C.

| | | |
|---|---|---|
| $T_{50}$ | 21.1 | 11.5 |
| $T_{90}$ | 44.0 | 17.1 |
| Time to 1 pt. Rise, Mins. | 3.9 | 6.3 |
| Maximum Torque | 30.4 | 30.7 |
| Minimum Torque | 11.3 | 6.7 |
| Delta | 19.1 | 24.0 |

Original Properties

| | | |
|---|---|---|
| Tensile (MPa) | 14.0 | 14.1 |
| Elongation (%) | 715 | 617 |
| Modulus 50% | 1.10 | 1.08 |
| Modulus 100% | 1.54 | 1.87 |
| Modulus 200% | 2.79 | 4.06 |
| Modulus 300% | 4.39 | 6.37 |
| Hardness (Shore A) | 58 | 53 |

TEXUS Flex 50° C.

| Cycles | Crack Propagation, Inches | |
|---|---|---|
| 100k | 0.12 | 0.10 |
| 250k | 0.18 | 0.14 |
| 500k | 0.26 | 0.24 |
| 1 mm | 0.32 | 0.46 |
| 1.5 mm | 0.39 | 0.64 |
| 2 mm | 0.40 | 0.76 |
| 2.5 mm | 0.41 | 0.86 |
| 3 mm | 0.43 | 0.92 |
| 3.5 mm | 0.44 | 1.00 |
| 4 mm | 0.44 | 1.00 |
| 4.5 mm | 0.46 | 1.00 |
| 5 mm | 0.48 | 1.00 |

Sample 1 showed a significant increase in flex properties compared to sample 2, as illustrated by resistance to crack propagation during the TEXUS flex test. However, the cure rate for sample 1 was much slower than for sample 2, as indicated by the $T_{50}$ and $T_{90}$ values.

EXAMPLE 2

In this Example, cover compounds were prepared with various cure accelerators to improve the cure rate of the compound. Samples were prepared and tested following the procedures of Example 1. Compound recipes are shown in Table 3, and physical properties are shown in Table 4.

TABLE 3

| Sample | 3 | 4 | 5 | 6 | 7 | 8 | 9 Control |
|---|---|---|---|---|---|---|---|
| Natural Rubber | 40 | 40 | 40 | 40 | 40 | 40 | 40 |
| Polybutadiene[1] | 20 | 20 | 20 | 20 | 20 | 20 | 20 |
| EPDM[2] | 70 | 70 | 70 | 70 | 70 | 70 | 70 |
| Carbon Black (N550) | 0 | 0 | 0 | 0 | 0 | 0 | 55 |
| Silica | 45 | 45 | 45 | 45 | 45 | 45 | 0 |
| Coupling Agent[3] | 5 | 5 | 5 | 5 | 5 | 5 | 0 |
| Stearic Acid | 1.5 | 1.5 | 1.5 | 1.5 | 1.5 | 1.5 | 1.5 |
| Peptizer | 0 | 0 | 0 | 0 | 0 | 0 | 0.15 |
| Resin | 3 | 3 | 3 | 3 | 3 | 3 | 3 |
| Antidegradant[5] | 0 | 0 | 0 | 0 | 0 | 0 | 6.28 |
| Naphthenic Oil | 4 | 4 | 4 | 4 | 4 | 4 | 1.1 |
| Wax[4] | 2.1 | 2.1 | 2.1 | 2.1 | 2.1 | 2.1 | 2.1 |
| Titanium Dioxide | 5 | 5 | 5 | 5 | 5 | 5 | 0 |
| Blue Pigment | 4 | 4 | 4 | 4 | 4 | 4 | 0 |
| Zinc Oxide | 4.31 | 4.31 | 4.31 | 4.31 | 4.31 | 4.31 | 4.31 |
| Sulfur | 1.89 | 1.89 | 1.89 | 1.89 | 1.89 | 1.89 | 1.72 |
| TBBS | 1 | 1 | 1 | 1 | 1 | 1 | 0.92 |
| 70% Dicumyl Peroxide | 1 | 1 | 1 | 1 | 1 | 1 | 0.92 |
| Diphenyl Guanidine | 0.5 | 0 | 0 | 0 | 0 | 0 | 0 |
| Hexamethylene-tetramine | 0 | 0.5 | 0 | 0 | 0 | 0 | 0 |
| 72% Tri-ethanolamine | 0 | 0 | 2 | 0 | 0 | 0 | 0 |
| Tetramethyl Thiuram Disulfide | 0 | 0 | 0 | 0.5 | 0 | 0 | 0 |
| Trialkylmethyl Ammonium Chloride | 0 | 0 | 0 | 0 | 0.5 | 0 | 0 |
| Polyethylene Glycol | 0 | 0 | 0 | 0 | 0 | 2 | 0 |

[1]BUDENE ® 1207
[2]ROYALENE ® 645
[3]SCA 98 WT, identified as 72 weight percent bi-functional polysulfidic organosilane dispersed on silica, obtained from Struktol
[4]paraffinic and microcrystalline
[5]paraphenylene diamine type

TABLE 4

Rheometer, ODR 150° C.

| | | | | | | | |
|---|---|---|---|---|---|---|---|
| $T_{50}$ | 26.8 | 25.5 | 15.8 | 6.8 | 28.3 | 27.9 | 14.1 |
| $T_{90}$ | 41.6 | 46.4 | 29.4 | 22.6 | 46.8 | 42.6 | 20.6 |
| Time to 1 pt. Rise, Minutes | 6.6 | 5.5 | 5.1 | 4.0 | 6.2 | 6.9 | 8.3 |
| Maximum Torque | 28.5 | 28.5 | 32.5 | 30.0 | 27.3 | 29.7 | 29.6 |
| Minimum Torque | 8.7 | 9.9 | 8.5 | 9.1 | 9.0 | 9.3 | 6.4 |
| Delta | 19.8 | 18.6 | 24.0 | 20.9 | 18.3 | 20.4 | 23.3 |

Original Properties

| | | | | | | | |
|---|---|---|---|---|---|---|---|
| Tensile (MPa) | 11.9 | 15.0 | 14.6 | 12.1 | 14.3 | 13.2 | 14.8 |
| Elongation (%) | 667 | 763 | 664 | 621 | 771 | 696 | 605 |
| Modulus 50% | 0.87 | 0.86 | 1.01 | 0.96 | 0.85 | 0.87 | 0.96 |
| Modulus 100% | 1.28 | 1.23 | 1.57 | 1.44 | 1.21 | 1.29 | 1.68 |

TABLE 4-continued

| | | | | | | | |
|---|---|---|---|---|---|---|---|
| Modulus 200% | 2.34 | 2.23 | 2.99 | 2.79 | 2.17 | 2.32 | 3.86 |
| Modulus 300% | 3.70 | 3.59 | 4.76 | 4.54 | 3.43 | 3.61 | 6.31 |
| Hardness (Shore A) | 55 | 55 | 57 | 56 | 54 | 54 | 53 |
| Die C Tear | | | | | | | |
| Tear(N/mm) | 34 | 33 | 40 | 31 | 34 | 32 | 42 |
| Strebler Adhesion, Room Temperature | | | | | | | |
| Average Load (N/cm) | 142 | 165 | 179 | 168 | 138 | 124 | 89 |
| Strebler Adhesion, 95° C. | | | | | | | |
| Average Load (N/cm) | 159 | 145 | 179 | 145 | 144 | 137 | 138 |

Sample 5 (containing triethanolamine) and Sample 6 showed a cure rate comparable to control sample 9, and significantly improved compared to the rate of Sample 1, as indicated by the $T_{50}$ and $T_{90}$ values. The tensile properties for sample 6 were inferior, however.

EXAMPLE 3

In this Example, cover compounds were prepared with various amounts of triethanolamine to demonstrate the effect of triethanolamine concentration. Samples were prepared and tested following the procedures of Example 1. Compound recipes are shown in Table 5, and physical properties are shown in Table 6.

TABLE 5

| Sample | 10 | 11 | 12 | 13 Control |
|---|---|---|---|---|
| Natural Rubber | 40 | 40 | 40 | 40 |
| Polybutadiene[1] | 20 | 20 | 20 | 20 |
| EPDM[2] | 70 | 70 | 70 | 70 |
| Carbon Black N550 | 0 | 0 | 0 | 55 |
| Silica | 45 | 45 | 45 | 0 |
| Coupling Agent[3] | 5 | 5 | 5 | 0 |
| Stearic Acid | 1.5 | 1.5 | 1.5 | 1.5 |
| Resin | 3 | 3 | 3 | 3 |
| Peptizer | 0 | 0 | 0 | 0.15 |
| Naphthenic Oil | 4 | 4 | 4 | 1.1 |
| Wax[4] | 2.1 | 2.1 | 2.1 | 2.1 |
| Titanium Dioxide | 5 | 5 | 5 | 0 |
| Blue Pigment | 4 | 4 | 4 | 0 |
| Antidegradant[5] | 0 | 0 | 0 | 6.28 |
| Zinc Oxide | 4.31 | 4.31 | 4.31 | 4.31 |
| Sulfur | 1.89 | 1.89 | 1.89 | 1.72 |
| TBBS | 1 | 1 | 1 | 0.92 |
| 40% Dicumyl Peroxide | 1.75 | 1.75 | 1.75 | 1.61 |
| 72% Triethanolamine | 2 | 3 | 4 | 0 |

[1]BUDENE ® 1207
[2]ROYALENE ® 645
[3]SCA 98 WT, identified as 72 weight percent bi-functional polysulfidic organosilane dispersed on silica, obtained from Struktol
[4]paraffinic and microcrystalline
[5]paraphenylene diamine type

TABLE 6

| Rheometer, ODR 150° C. | | | | |
|---|---|---|---|---|
| $T_{50}$ | 13.1 | 9.5 | 7.3 | 13.7 |
| $T_{90}$ | 28.6 | 23.2 | 19.7 | 19.6 |
| Time to 1 pt. Rise, Mins. | 3.9 | 3.4 | 3.0 | 7.4 |
| Maximum Torque | 34.0 | 35.5 | 36.1 | 29.9 |
| Minimum Torque | 9.9 | 9.9 | 10.0 | 6.3 |
| Delta | 24.1 | 25.7 | 26.2 | 23.6 |

TABLE 6-continued

| Original Properties | | | | |
|---|---|---|---|---|
| Tensile (MPa) | 12.4 | 13.1 | 12.1 | 13.0 |
| Elongation (%) | 559 | 567 | 531 | 573 |
| Modulus 50% | 1.22 | 1.29 | 1.30 | 0.99 |
| Modulus 100% | 1.91 | 2.08 | 2.10 | 1.69 |
| Modulus 200% | 3.62 | 4.01 | 4.01 | 3.68 |
| Modulus 300% | 5.65 | 6.20 | 6.23 | 5.98 |
| Hardness (Shore A) | 61 | 63 | 63 | 54 |
| Die C Tear | | | | |
| Tear (N/mm) | 36 | 36 | 38 | 38 |

Samples 10–12 containing triethanolamine showed a cure rates comparable to control sample 13, as indicated by the $T_{50}$ and $T_{90}$ values.

EXAMPLE 4

In this example, a cover compounds were prepared with an effective amount of triethanolamine to compare the compound with a control carbon black cover. Samples were prepared and tested following the procedures of Example 1. Compound recipes are shown in Table 7, and physical properties are shown in Table 8.

TABLE 7

| Sample | 14 Control | 15 |
|---|---|---|
| Natural Rubber | 40 | 40 |
| Polybutadiene[1] | 20 | 20 |
| EPDM[2] | 70 | 70 |
| Carbon Black N550 | 55 | 0 |
| Silica | 0 | 40 |
| Coupling Agent[3] | 0 | 6.3 |
| Peptizer | 0.15 | 0 |
| Resin | 3 | 3 |
| Naphthenic Oil | 0 | 4 |
| Wax[4] | 2.1 | 2.1 |
| Stearic Acid | 1.5 | 1.5 |
| Antidegradant[5] | 6.28 | 0 |
| Zinc Oxide | 4.31 | 4.31 |
| 40% Dicumyl Peroxide | 1.61 | 1.75 |
| Sulfur | 1.72 | 1.89 |
| TBBS | 0.92 | 1 |
| Triethanolamine | 0 | 2.5 |

[1]BUDENE ® 1207
[2]ROYALENE ® 645
[3]SI-69, 50% by weight on carbon black
[4]paraffinic and microcrystalline
[5]paraphenylene diamine type

TABLE 8

| ODR Rheometer, 150° C. | | |
|---|---|---|
| $T_{50}$ | 11.2 | 10.8 |
| $T_{90}$ | 16.3 | 19.1 |
| Time to 1 pt. Rise, Mins. | 6.0 | 3.8 |
| Maximum Torque | 33.5 | 37.4 |
| Minimum Torque | 6.9 | 7.6 |
| Delta | 26.6 | 29.8 |
| Original Properties | | |
| Tensile (MPa) | 14.3 | 14.3 |
| Elongation (%) | 579 | 616 |
| Modulus 50% | 1.12 | 1.10 |
| Modulus 100% | 1.95 | 1.72 |
| Modulus 200% | 4.33 | 3.31 |
| Modulus 300% | 6.86 | 5.17 |
| Hardness (Shore A) | 57 | 58 |
| Die C Tear | | |
| Tear (N/mm) | 43 | 36 |
| Compression Set "B", 70 Hrs @ 70° C. | | |
| % Set | 18 | 19 |
| Strebler Adhesion To Ply Compound, Rt | | |
| Average Load (N/cm) | 88 | 93 |
| TEXUS Flex. 50° C. | Crack Propagation, Inches | |
| 100k | 0.10 | 0.10 |
| 250k | 0.10 | 0.12 |
| 500k | 0.13 | 0.13 |
| 1 mm | 0.30 | 0.16 |
| 1.5 mm | 0.66 | 0.18 |
| 2 mm | 0.78 | 0.19 |
| 2.5 mm | 0.90 | 0.19 |
| 3 mm | 0.92 | 0.21 |
| 3.5 mm | 0.96 | 0.21 |
| 4 mm | 0.96 | 0.23 |
| 4.5 mm | 0.97 | 0.23 |
| 5 mm | 1.00 | 0.24 |
| TEXUS Flex. 100° C. | Crack Propagation, Inches | |
| 100k | 0.15 | 0.14 |
| 250k | 0.19 | 0.17 |
| 500k | 0.26 | 0.22 |
| 1 mm | 0.39 | 0.3 |
| 1.5 mm | 0.5 | 0.47 |
| 2 mm | 0.69 | 0.5 |
| 2.5 mm | 0.74 | 0.5 |
| 3 mm | 0.93 | 0.51 |
| 3.5 mm | 1 | 0.53 |
| 4 mm | 1 | 0.53 |
| 4.5 mm | 1 | 0.54 |
| 5 mm | 1 | 0.56 |

While certain representative embodiments and details have been shown for the purpose of illustrating the invention, it will be apparent to those skilled in this art that various changes and modifications may be made therein without departing from the spirit or scope of the invention.

What is claimed is:

1. An airspring having an airsleeve comprising an elastomeric liner; a reinforcing layer overlaying the liner; and a colorable elastomeric cover overlaying the reinforcing layer; the cover comprising:
   100 parts by weight of elastomer comprising from about 30 to about 50 parts by weight of natural rubber, from about 10 to about 30 parts by weight of polybutadiene, and from about 30 to about 50 parts by weight of ethylene propylene diene terpolymer (EPDM);
   from about 20 to about 60 parts by weight, per 100 parts by weight of elastomer, of silica; and
   from about 1 to about 10 parts by weight, per 100 parts by weight of elastomer, of an organosilane polysulfide.

2. The airspring of claim 1, wherein the cover further comprises from about 1 to about 5 parts by weight, per 100 parts by weight of elastomer, of triethanolamine.

3. The airspring of claim 1, wherein the cover is cured with sulfur and peroxide.

4. The airspring of claim 1, wherein the cover further comprises at least one colorant.

5. The airsleeve of claim 1, wherein the cover further comprises at least one colorant selected from organic dyes, inorganic dyes, organic pigments, and inorganic pigments, and carbon black.

6. The airspring of claim 1, the reinforcing layer comprising: textile fibers having distributed over surface portions thereof an RFL adhesive; and a vulcanizable plycoat rubber composition.

7. The airspring of claim 6, wherein said textile fiber are selected from the group consisting of woven fabrics, knitted fabric, or spun bonded fabric, and fiber cord.

8. The airspring of claim 6, wherein said textile fibers comprises a material selected from the group consisting of rayon, nylon, polyester, aramid, cotton, and combinations thereof.

9. The airspring of claim 6, wherein textile fibers comprises nylon.

10. The airspring of claim 1 wherein said airspring is selected from shock absorbers, struts, truck cab suspension springs, truck driver seat springs, automobile airsprings, and industrial airsprings.

11. The airspring of claim 1 wherein the cover is exclusive of staining or coloring antioxidants and antiozonants.

12. The airspring of claim 6, wherein said RFL comprises resorcinol, formaldehyde, and at least one polymer selected from styrene-butadiene copolymer and vinylpyridene-styrene-butadiene terpolymer.

13. An airspring of claim 1, wherein the airspring is a bellows type airspring.

14. An airspring of claim 1, wherein the airspring is a rolling lobe airspring.

15. An airspring having an airsleeve comprising an elastomeric liner; a reinforcing layer overlaying the liner; and a colorable elastomeric cover overlaying the reinforcing layer; the cover comprising:
   100 parts by weight of elastomer comprising from about 30 to about 50 parts by weight of natural rubber, from about 10 to about 30 parts by weight of polybutadiene, and from about 30 to about 50 parts by weight of ethylene propylene diene terpolymer (EPDM);
   from about 20 to about 60 parts by weight, per 100 parts by weight of elastomer, of silica; and
   from about 1 to about 10 parts by weight, per 100 parts by weight of elastomer, of an organosilane polysulfide;
   from about 1 to about 5 parts by weight, per 100 parts by weight of elastomer, of triethanolamine; and
   a colorant; and
   wherein the cover is sulfur and peroxide cured.

16. The airspring of claim 15 wherein the cover is exclusive of staining or coloring antioxidants and antiozonants.

* * * * *